(12) United States Patent
Hygema

(10) Patent No.: US 8,006,523 B2
(45) Date of Patent: *Aug. 30, 2011

(54) WATER VALVE SNAP FIT RETENTION FOR A VACUUM BREAK

(75) Inventor: Terry Hygema, Greenville, SC (US)

(73) Assignee: Group Dekko, Inc., Kedallville, IN (US)

( * ) Notice: Subject to any disclaimer, the term of this patent is extended or adjusted under 35 U.S.C. 154(b) by 1250 days.

This patent is subject to a terminal disclaimer.

(21) Appl. No.: 11/243,429

(22) Filed: Oct. 4, 2005

(65) Prior Publication Data

US 2006/0226384 A1 Oct. 12, 2006

Related U.S. Application Data

(60) Provisional application No. 60/615,870, filed on Oct. 5, 2004.

(51) Int. Cl.
*D06F 39/08* (2006.01)

(52) U.S. Cl. .......................................... 68/207; 68/3 R

(58) Field of Classification Search ................. 251/143; 137/216, 217; 68/207
See application file for complete search history.

(56) References Cited

U.S. PATENT DOCUMENTS

| | | | | |
|---|---|---|---|---|
| 2,211,212 A | * | 8/1940 | Langdon | 137/512 |
| 2,686,528 A | * | 8/1954 | Snyder | 137/217 |
| 2,939,474 A | * | 6/1960 | Simone | 137/119.04 |
| 3,171,423 A | * | 3/1965 | Dillon | 137/218 |
| 3,172,426 A | * | 3/1965 | Cole | 137/636.4 |
| 3,447,559 A | * | 6/1969 | McCornack | 137/218 |
| 3,543,786 A | * | 12/1970 | Woodford | 137/218 |
| 3,578,016 A | * | 5/1971 | Kushner | 137/216 |
| 3,856,036 A | * | 12/1974 | Drews et al. | 137/216.1 |
| 3,964,108 A | | 6/1976 | Lissau | 4/7 |
| 4,275,470 A | | 6/1981 | Badger et al. | 4/316 |
| 4,344,756 A | | 8/1982 | Folkenroth et al. | 433/92 |
| 5,065,786 A | | 11/1991 | Rozenblatt | 137/202 |
| 5,407,238 A | * | 4/1995 | Werner et al. | 285/61 |
| 6,000,674 A | | 12/1999 | Cheng | 251/26 |
| 6,546,946 B2 | | 4/2003 | Dunmire | 137/15.18 |
| 6,932,100 B2 | * | 8/2005 | Martin et al. | 137/15.18 |
| 2004/0025238 A1 | | 2/2004 | Parsons et al. | 4/378 |
| 2004/0064880 A1 | | 4/2004 | Beh | 4/354 |
| 2006/0157110 A1 | * | 7/2006 | Yeh | 137/218 |

FOREIGN PATENT DOCUMENTS

| CH | 595596 A | * | 2/1978 |
|---|---|---|---|
| EP | 0761988 A1 | * | 3/1997 |
| GB | 2285302 A | * | 8/1993 |

* cited by examiner

*Primary Examiner* — Michael Barr
*Assistant Examiner* — Jason P Riggleman
(74) *Attorney, Agent, or Firm* — Taylor IP

(57) ABSTRACT

A vacuum break assembly including a housing, at least one valve assembly and at least one biased latch. The housing has at least one opening therein. The at least one valve assembly is coupled to the at least one opening in a sliding manner. The at least one biased latch couples the valve assembly to the housing.

12 Claims, 4 Drawing Sheets

WATER VALVE SNAP FIT RETENTION FOR A VACUUM BREAK

CROSS REFERENCE TO RELATED APPLICATION

This is a non-provisional application based upon U.S. provisional patent application Ser. No. 60/615,870, entitled "WATER VALVE SNAP-FIT RETENTION FOR VACUUM BREAK ASSEMBLY", filed Oct. 5, 2004.

BACKGROUND OF THE INVENTION

1. Field of the Invention

The present invention relates to a water valve assembly, and, more particularly to a water valve assembly connected to a vacuum break.

2. Description of the Related Art

Vacuum breaks are utilized in water systems in order to prevent a siphoning action from occurring between a device utilizing water and the water supply. For example, vacuum breaks are utilized in certain toilet flushing systems so that there is an opportunity for air to enter between the water source and the water being used by the device. Another application for vacuum breaks are in wash machines where the water supply may be a mixture of hot and cold water that is then supplied to a washing tub with the vacuum break serving the dual function of mixing the hot and cold water in a mixing chamber and providing a break between the water supply and the water in the washing tub. Vacuum breaks for washing machines allow for the introduction of atmospheric air in the water flow so that a siphon is not created that would draw additional water from the source or allow contamination from a water path that may be in contact with water in the tub and the valve. Contamination risk is greatest if water pressure from the water source is lost and the valve is opened and if the valve is in contact with water from the wash tub contamination of the source water would result. For this reason a vacuum break is utilized to prevent the possibility of a water source contamination. Additionally the vacuum break may allow a mixing of the water from the water sources prior to the water being utilized in the washing tub.

Vacuum breaks have water valve assemblies associated therewith, which may be attached thereto. The water valve assemblies require the use of numerous tools and extensive assembly procedures in order to connect the vacuum break with water control valves.

What is needed in the art is an inexpensive, easily assembled valve assembly/vacuum break combination.

SUMMARY OF THE INVENTION

The present invention relates to a vacuum break assembly with an easily attached valve assembly.

The invention comprises, in one form thereof, a vacuum break assembly including a housing, at least one valve assembly and at least one biased latch. The housing has at least one opening therein. The at least one valve assembly is coupled to the at least one opening in a sliding manner. The at least one biased latch couples the valve assembly to the housing.

An advantage of the present invention is that the valve assembly is connected to the vacuum break without the need of any tools.

Another advantage of the present invention is that it is coupled to the vacuum break assembly by simply pushing the assemblies together.

Another advantage of the present invention is that a retaining feature additionally serves to orient and direct the valve assembly to an opening in the vacuum break.

Yet another advantage of the present invention is that the valve assembly can be removed from the vacuum break by providing a biasing force against a spring arm to thereby release the valve assembly from the vacuum break.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
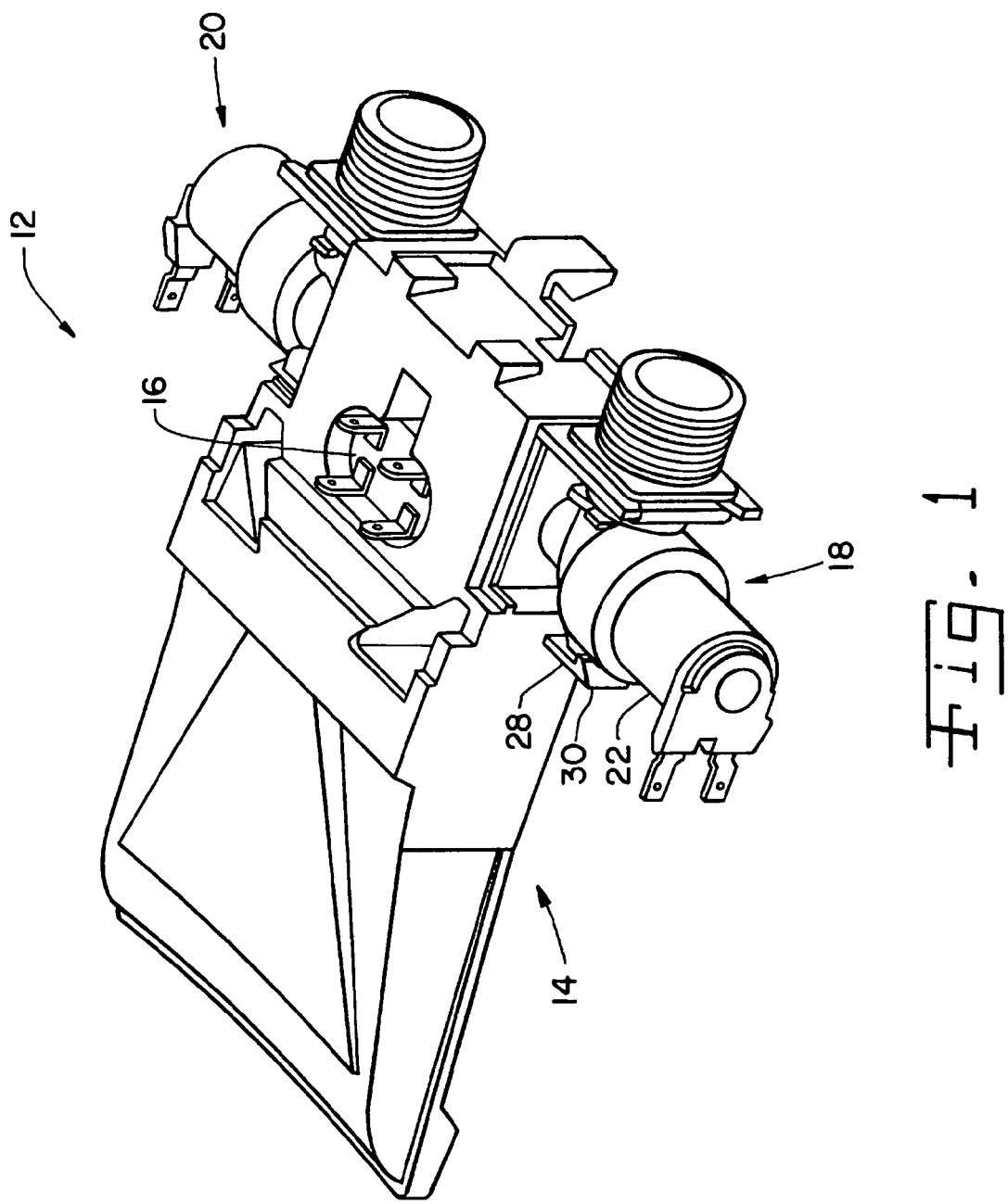
FIG. 1 is a perspective view of an embodiment of a vacuum break assembly having solenoid valves of the present invention installed therein.
Figure 2:
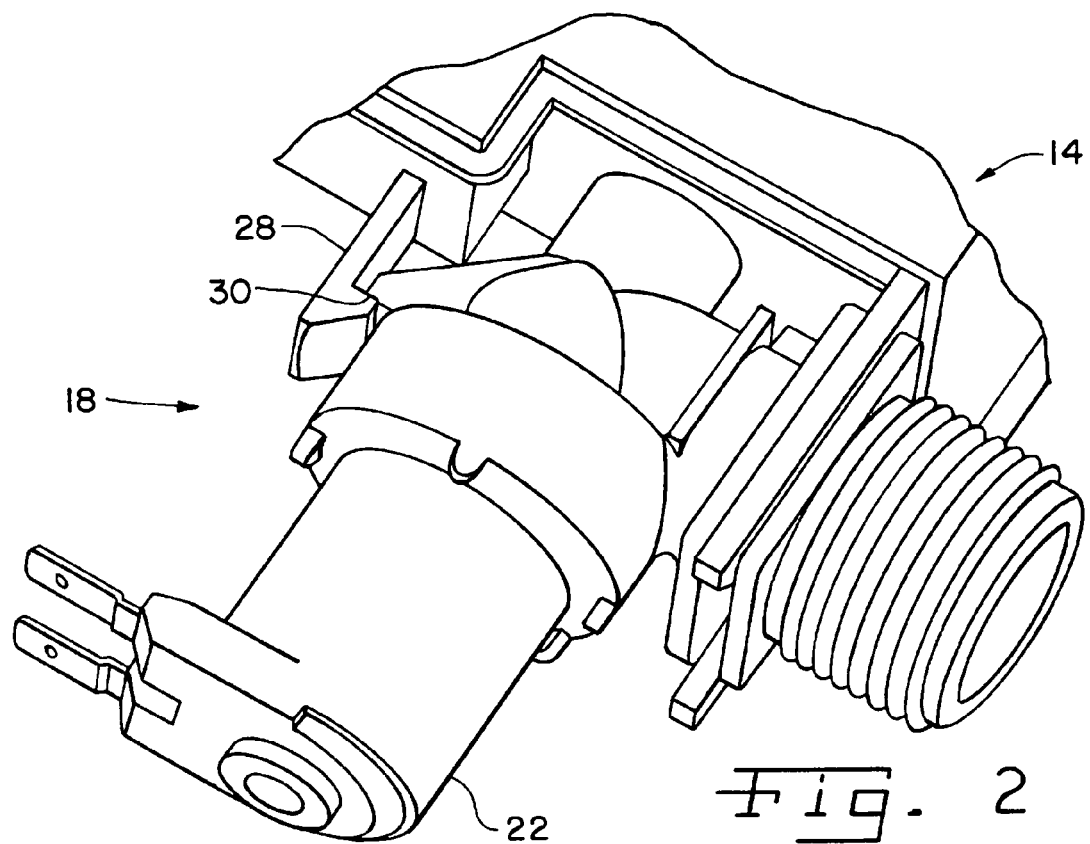
FIG. 2 is a perspective drawing of a solenoid valve of FIG. 1 installed in the housing of FIG. 1.
Figure 3:
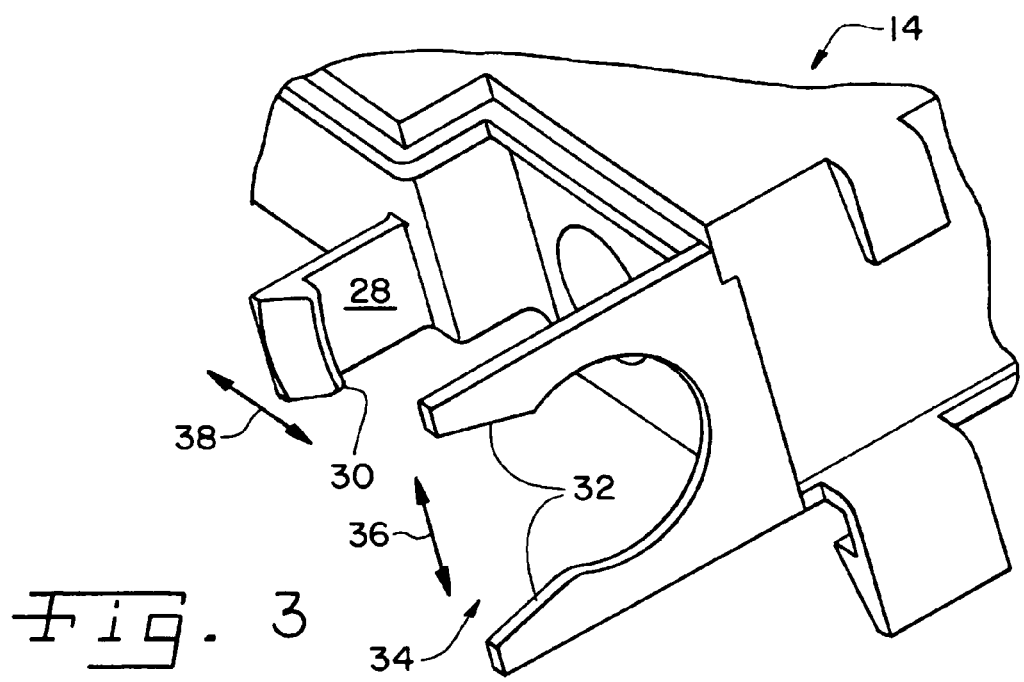
FIG. 3 illustrates retention features of the housing of the vacuum break of FIGS. 1 and 2.
Figure 4:
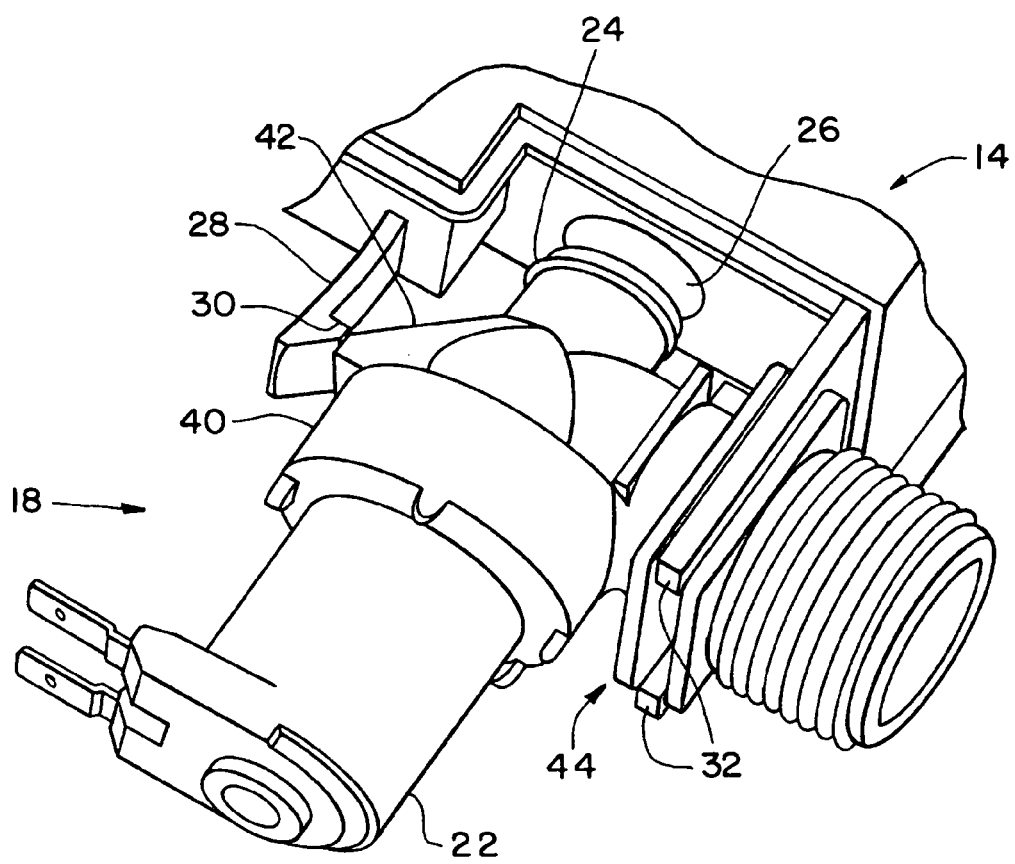
FIG. 4 illustrates the assembly of the solenoid valve assembly of FIGS. 1 and 2 to the housing of FIGS. 1-3.
Figure 5:
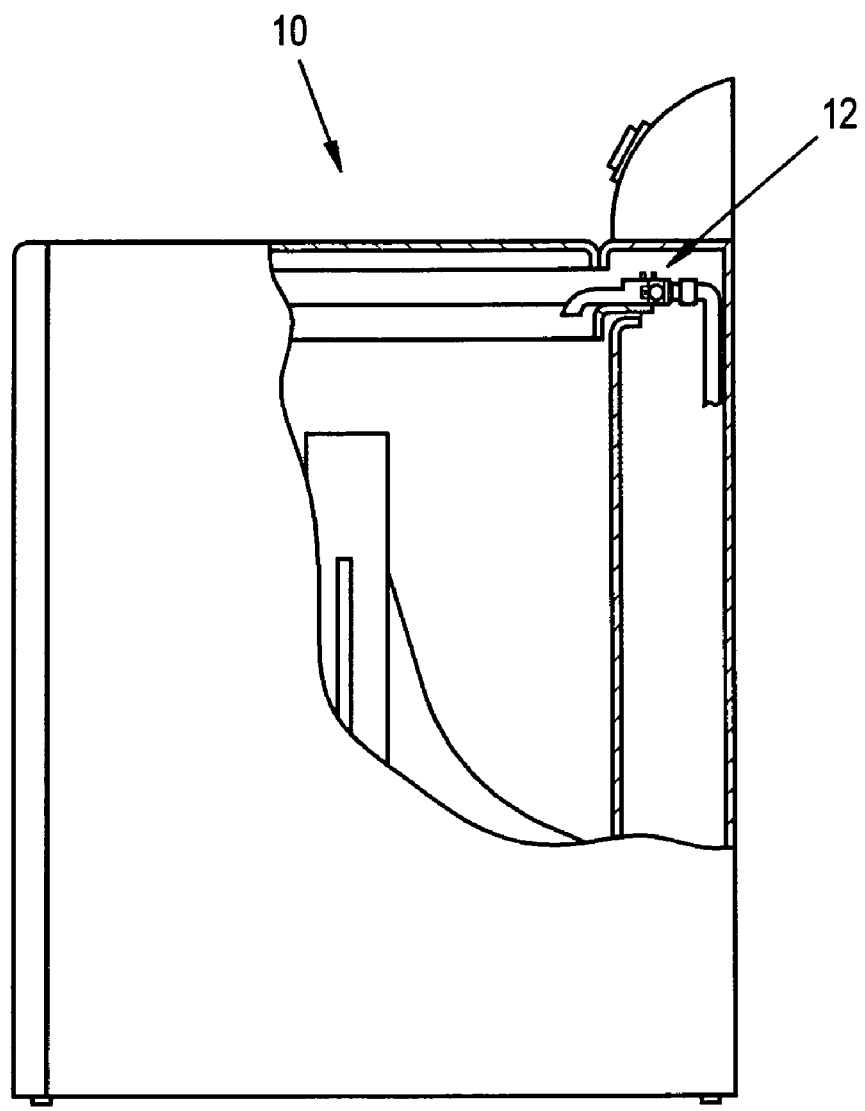
FIG. 5 illustrates the vacuum break assembly of FIGS. 1-4 installed in a washing machine.

Referring now to the drawings, and more particularly to FIGS. 1-5, there is illustrated a washing machine 10 including a vacuum break assembly 12. Vacuum break assembly 12 includes a housing 14, a temperature sensor 16, a valve assembly 18 and a valve assembly 20. Temperature sensor 16 is adjacent to a mixing cavity in which water from both the hot and cold supply are mixed and the temperature is controlled by a control device, not shown. Valve assemblies 18 and 20 are respectively assigned to cold and hot water supplies that are coupled in a conventional manner by way of a hose to hot and cold water supplies. Valve assemblies 18 and 20 are substantially similar and for all practical purposes are identical in every respect. For the sake of convenience only valve assembly 18 will be discussed, with the understanding that the attributes of valve assembly 18 are also included in valve assembly 20.

Valve assembly 18 includes a solenoid 22 for operative activation by a control system, not shown. Although solenoid 22 is depicted, it is understood that a control mechanism other than a solenoid may be utilized in operating valve assembly 18. Valve assembly 18 additionally includes a sealing ring 24, which co-acts with a surface of an opening 26 in housing 14 to provide a waterproof seal for the water that travels through valve assembly 18. Hot and cold water is mixed in a mixing chamber contained in vacuum break assembly 12, the chamber exists between valve assemblies 18 and 20. A control system variously activates valve assemblies 18 and 20 to control the temperature of water that travels through the mixing chamber of vacuum break 12.

Housing 14 additionally includes features on each side that are replicated to accommodate each of valve assemblies 18 and 20. Again for the sake of convenience, only those attributes on one side of housing 14 will be discussed. It is to be understood that the features discussed as existing on one side of housing 14 to accommodate valve assembly 18 are existent in a substantially similar fashion on an opposite side of housing 14 to accommodate valve assembly 20. Housing 14 includes a spring arm 28 having a retaining feature 30, and dual spring arms 32 having an over-center slot 34. Spring arm 28, also known as a biased latch 28, is flexible in a direction 36 allowing retainer 30 to engage a notch or ledge on valve assembly 18. Dual spring arms 32 are flexible in directions 38. Direction 36 is substantially perpendicular to direction 38. Dual spring arms 32 additionally guide valve assembly 18 and orient it so that a portion of valve assembly 18 is directed toward opening 26.

Valve assembly 18 includes a body 40, a ramped surface 42 and a channel 44. Ramped surface 42 interacts with spring arm 28 so that as valve assembly 18 is assembled to housing 14 spring arm 28 flexes away from body 40 as it travels along ramped surface 42. As retainer 30 moves past ramped surface 42, spring arm 28 returns to its substantially unbiased position, thereby holding valve assembly 18 in an assembled position with housing 14.

In the assembly process of vacuum break 12, channel 44 of valve assembly 18 is oriented relative to dual spring arms 32 and is moved toward housing 14 causing dual spring arms 32 to flex outwardly allowing a curved inner surface between channel 44, which is substantially similar to a curved portion of over-center slot 34. Channel 44 co-acts with dual spring arms 32 to orient and direct valve assembly 18 toward opening 26 and ramped surface 42 to contact retainer 30 of spring arm 28.

Once valve assembly 18 is snapped into place with housing 14, it should be noted that the portion of body 40 that has entered opening 26 along with dual spring arms 32 securely hold valve assembly 18 so that valve assembly 18 will not rotate or move relative to housing 14 when a hose coupling is connected to the threaded portion of body 40. Further, the assembly of valve assembly 18 with housing 14 is accomplished without the need for any tools. This hand operation is accomplished very quickly and can be undone by simply applying a biasing force on spring arm 28 to allow retainer 30 to be disengaged from body 40. Valve assembly 18 can then be pulled from its position relative to housing 14.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A vacuum break assembly, comprising:
a housing having at least one opening;
at least one valve assembly coupled to said at least one opening in a sliding manner;
at least one biased latch coupling said valve assembly to said housing; and
at least one set of dual spring arms attached to said housing, said at least one valve assembly including a channel that interacts with said dual spring arms to orient said valve assembly to said housing, said dual spring arms being configured to flex in opposite directions while said dual spring arms are in said channel as said at least one valve assembly is assembled to said housing.

2. The vacuum break assembly of claim 1, wherein said dual spring arms flex in a direction and said biased latch flexes in an other direction that is substantially normal to said direction.

3. The vacuum break assembly of claim 1, wherein said at least one valve assembly includes a ramped surface that causes said biased latch to flex outwardly from said at least one valve assembly during the assembly of said at least one valve assembly to said housing.

4. The vacuum break assembly of claim 1, wherein said at least one valve assembly is coupled to said housing without the use of any tools.

5. The vacuum assembly of claim 1, wherein said set of dual spring arms are respectively configured to flex in first and second directions, said biased latch being configured to flex in a third direction, said first direction, said second direction, and said third direction each being different.

6. The vacuum assembly of claim 5, wherein said first direction and said second direction are substantially coplanar, said third direction being substantially normal to said first direction and said second direction.

7. A washing machine, comprising:
an enclosure; and
a vacuum break assembly attached to said enclosure, said vacuum break including:
a housing having at least one opening;
at least one valve assembly coupled to said opening in a sliding manner;
at least one biased latch coupling said valve assembly to said housing; and
at least one set of dual spring arms attached to said housing, said at least one valve assembly including a channel that interacts with said dual spring arms to orient said valve assembly to said housing, said dual spring arms being configured to flex in opposite directions while said dual spring arms are in said channel as said at least one valve assembly is assembled to said housing.

8. The washing machine of claim 7, wherein said dual spring arms flex in a direction and said biased latch flexes in an other direction that is substantially normal to said direction.

9. The washing machine of claim 7, wherein said at least one valve assembly includes a ramped surface that causes said biased latch to flex outwardly from said at least one valve assembly during the assembly of said at least one valve assembly to said housing.

10. The washing machine of claim 7, wherein said at least one valve assembly is coupled to said housing without the use of any tools.

11. The washing machine of claim 7, wherein said set of dual spring arms are respectively configured to flex in first and second directions, said biased latch being configured to flex in a third direction, said first direction, said second direction, and said third direction each being different.

12. The washing machine of claim 11, wherein said first direction and said second direction are substantially coplanar, said third direction being substantially normal to said first direction and said second direction.

* * * * *